(12) United States Patent
Cipollini

(10) Patent No.: US 7,087,330 B2
(45) Date of Patent: Aug. 8, 2006

(54) STORING WATER IN SUBSTRATES FOR FROZEN, BOOT-STRAP START OF FUEL CELLS

(75) Inventor: Ned E. Cipollini, Enfield, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 288 days.

(21) Appl. No.: 10/763,793

(22) Filed: Jan. 22, 2004

(65) Prior Publication Data

US 2005/0164049 A1 Jul. 28, 2005

(51) Int. Cl.
*H01M 8/00* (2006.01)
*H01M 8/04* (2006.01)
*H01M 2/14* (2006.01)

(52) U.S. Cl. .............................. 429/13; 429/26; 429/39

(58) Field of Classification Search ................. 429/13, 429/26, 34, 39
See application file for complete search history.

(56) References Cited

U.S. PATENT DOCUMENTS 5,998,058 A * 12/1999 Fredley ..................... 429/44
6,379,827 B1 * 4/2002 Cipollini ..................... 429/13

* cited by examiner

*Primary Examiner*—Patrick Joseph Ryan
*Assistant Examiner*—Thomas H. Parsons
(74) *Attorney, Agent, or Firm*—M. P. Williams

(57) ABSTRACT

Fuel cells (16) include a proton exchange membrane (18) with cathode catalyst (24) and anode catalyst (20) on opposing surfaces thereof. An anode support plate (21) includes a hydrophilic substrate (22) and a cathode support plate (25) includes a hydrophilic substrate (26) and a contact bilayer (diffusion layer) (24). Water transport plates (12, 14) are adjacent corresponding support plates. Upon shut down of the fuel cell stack, the support plates (21, 25) fill to 60%–80% of their water capacity, thereby to provide water (from melting ice) upon a bootstrap start of the frozen cells. In one embodiment, the amount of water is controlled by the pressure differential between the coolant and the reactant gases; in another embodiment, the amount of water is controlled by having hydrophobic regions (93) substantially uniformly dispensed in a hydrophilic substrate (94) in either the support plates (22a) or the contact bilayer (27).

8 Claims, 3 Drawing Sheets

STORING WATER IN SUBSTRATES FOR FROZEN, BOOT-STRAP START OF FUEL CELLS

TECHNICAL FIELD

This invention relates to partially filling fuel cell support plate substrates with water during shutdown so that water is available to humidify and cool the cell during a frozen bootstrap start, without blocking reactant gases from the electrodes.

BACKGROUND ART

Whenever the fuel cell power plant may be inoperative at below freezing temperatures, whether or not antifreeze coolant is used in a fuel cell power plant, at least product water and membrane humidification must be dealt with in shutting down and restarting the fuel cell power plant. There are various schools of thought concerning steps that may or should be taken in order to avoid damage to the fuel cell power plant due to water expansion when it freezes, and to achieve startup with no water, or with frozen water.

In U.S. Pat. No. 6,596,426 a procedure is set forth to remove all of the water from the water transport plates and from the electrode substrates. This, of course, is deemed favorable to prevent damage from ice. In U.S. patent application Ser. No. 10/390,439 filed Mar. 17, 2003 (now U.S. Pat. No. 6,703,870), that procedure is endorsed as desirable since it leaves the hydrophilic substrates of the electrode support plates empty, thereby being available to store newly-generated product water. In that application, the starting up and running of a fuel cell driving an electrical load is said to be possible for several minutes; however, depending upon all of the attendant conditions, there may be local overheating due to an inadequate cooling capability and membrane dry out.

In U.S. Pat. No. 6,379,827, a procedure is established for filling the electrode substrates with water so as to isolate the membrane from reactant conditions that may occur during startup or shut down. In that patent, as shown in FIG. 1 herein, a fuel cell power plant 10 illustrates one cell, which however is repeated throughout a fuel cell stack. Each fuel cell includes fine pore, flow field plates 12 and 14 used to form the reactant and coolant or water circulating flow fields when a series of cells are pressed together in a stack. These flow field plates are sometimes also referred to as "water transport plates". The system 10 has a membrane electrode assembly (MEA) 16 which includes a polymer electrolyte, proton exchange membrane (PEM) 18, an anode catalyst layer 20 on the anode side of the membrane 18, and a cathode catalyst layer 24 on the cathode side of the membrane 18. An anode support plate 21 is positioned adjacent the anode catalyst layer 20, and a cathode support plate 25 is positioned adjacent the cathode catalyst layer 24. As depicted in FIG. 1, the anode support plate 21 includes a hydrophilic (wettable) anode substrate 22 in accordance with the invention. The cathode support plate 25 also includes a hydrophilic cathode substrate 26 and further, a hydrophobic (non-wettable) cathode diffusion layer (contact bi-layer) 27.

A set of the flow field plates 12 and 14 of adjacent cells are provided in back-to-back relationship on each side of the MEA 16, outward of the anode and cathode support plates 21, 25. Opposite surfaces of the plate are provided with a pattern of projections 28 and 30 which form a network of grooves 32 and 34 on opposite sides of the plate 12. The grooves 32 form a portion of a coolant water flow field 36 in the stack, and the grooves 34 form a cathode or oxidant reactant flow field 38 for each cell of the stack. The plate 14 is also formed with projections 40 and 42, and a network of grooves 44 and 46 on its opposite surfaces. The grooves 44 form a portion of the water coolant flow field 36, and the grooves 46 from an anode or fuel reactant flow field 48 for each cell in the stack. For simplicity of illustration, the cathode and the anode flow fields 38, 48 are shown in FIG. 1 as extending in the same direction, but preferably extend in directions perpendicular to each other. Moreover, the projections 40 and 42 and the grooves 44 and 46 may be of a variety of shapes and configurations other than as shown.

All of the anode reactant flow fields 48 in the system 10 are supplied with a hydrogen gas reactant from a pressurized fuel source 50, such as a supply tank. The fuel source 50 may be a fuel processing system, which, as is known to those skilled in this art, converts a hydrocarbon fuel such as natural gas or gasoline into a hydrogen rich stream. The hydrogen reactant flows from the supply tank 50 to the anode flow fields 48 through a supply line 52, and the anode exhaust leaving the anode flow fields 48 is directed by an exhaust line 53 to a burner (not shown) or recycle loop (not shown). The pressure of hydrogen flowing through the supply line 52 is controlled by a controller 54 which controllably adjusts a supply valve 56. The pressure of hydrogen flowing through the supply line 52 may additionally be controlled by a pressure regulator 58. The pressures of the reactant in the anode flow field 48 and the reactant in the cathode flow field 38 are preferably about the same level. The present example operates with reactants at near ambient pressure, but higher pressure operation is also possible.

All the cathode flow fields 38 are supplied with ambient air via an air blower or compressor 60 actuated by the controller, and an air line 62. The oxygen used in the electrochemical reaction is thus derived from a source 61 which may be ambient air or a pressurized oxygen.

Coolant water is circulated through the power plant cell units via line 64. The coolant water passes through the coolant flow fields or passages 36 between the plates 12 and 14. Circulation of the coolant water is driven by a fixed or variable speed pump 66 which is actuated by controller 54. The coolant water circulating loop includes a heat exchanger 68 which lowers the temperature of the water exiting from the coolant passages 36, a valve 78, and a water accumulator 70 which includes an overflow drain line 72, a drain valve 74, a vent line 75 and a level sensor 76 for controllably opening and closing the drain valve. The accumulator 70 is positioned below the cell stack assembly, and the water volume held by the accumulator and coolant channels must be sufficient to fill both substrates 22 and 26 in all of the fuel cells. The substrates 22 and 26 fill at shutdown because of the capillary forces drawing water into their pores. As a result, the accumulator 70 can actually be at a position below the cell stack and the substrates 22 and 26 will still fill. For hydrophilic substrates with pore diameters of about 30 microns, water will rise, or wick, upwardly as much as 26 inches.

The procedure in the aforesaid patent was not offered for use in fuel cells which will be shut down at sub-freezing temperatures. If it were, the problem would be that with the substrates totally occluded with ice, the reactant gases could not reach the membrane, and therefore the fuel cell power plant could not be operated until water in the substrates was melted by some means other than operation of the fuel cell power plant to generate electric current.

DISCLOSURE OF INVENTION

Objects of the invention include: increasing the time that a frozen fuel cell power plant can be operated during a boot strap start without localized overheating; avoiding membrane dryout during bootstrap start of frozen fuel cells; and improved shut down/startup procedures for fuel cell power plants which will be dormant at subfreezing temperatures.

According to the present invention, the electrode support plate substrates of fuel cells are only partially filled with water when the fuel cell is shut down in an ambient which may experience sub-freezing temperatures, thereby providing water adjacent the membrane to humidify it in the early stages of a boot strap startup, the heat from the intimate process melting the water substantially instantaneously upon application of reactants to the cell, the partial filling (rather than totally filling) allowing the passage of reactant gases through the substrate; the heat of fusion and the latent sensible heat of the water in the substrates assist in cooling the cell during the time before the coolant system is sufficiently thawed to be operative upon startup.

According to one embodiment of the present invention, hydrophilic substrates are partially filled, or saturated, with water by controlling the pressure differential between the reactant gases and the water in adjacent porous water transport plates; for instance, the water content of hydrophilic substrates will stabilize in a few minutes to on the order of 10%–20% full of water if the pressure of water is about 14 kPa (2 psi) below the pressure of the reactant gases; if there is only about a 7 kPa (1 psi) difference in pressure between the water and the reactant gases, the hydrophilic substrates will be about half full of water. It may be preferable to have the hydrophilic substrates be on the order of 60%–80% full of water and still more preferable to have the hydrophilic substrates about 70% full. This can be achieved, depending upon the particular fuel cell power plant involved, by adjusting the pressure differential between the water and the reactant gas to on the order of 5 kPa–6 kPa (0.72 psi–0.87 psi).

In this example the hydrophilic substrate has a nominal mean pore size of about 30 microns. The pressure differential required to create a particular level of saturation of the substrates with water is dependent upon the pore size distribution of the substrate. One skilled in the art can determine the percent saturation of the substrate with water, as a function of the gas-to-water pressure differential, by physical measurements of the hydrophilic substrate.

According to another embodiment of the present invention, the substrates may be fabricated to be partially hydrophilic and partially hydrophobic, in a substantially uniform manner, throughout the substrate. This may be achieved utilizing procedures set forth in U.S. Pat. No. 5,998,058 or, in the case of support plates employing a contact bi-layer (a diffusion layer), in U.S. Pat. No. 6,024,848.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 2:
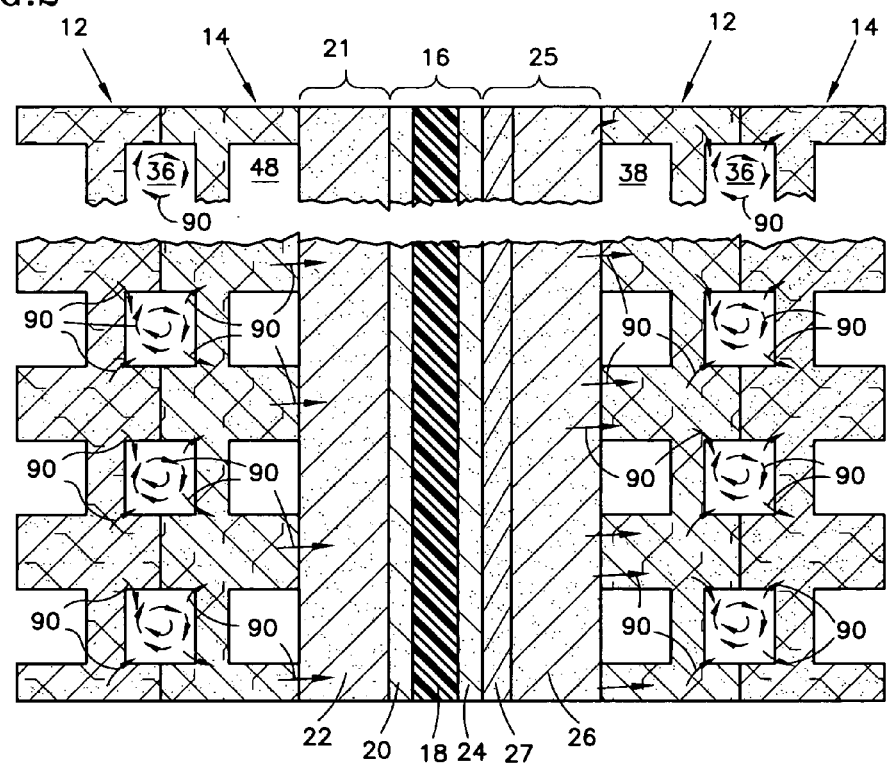
FIG. 2 is a stylized sectional view of the fuel cell illustrated in FIG. 1, illustrating the relative distribution of coolant during operation under load, when the reactant gases are at a pressure sufficiently greater than the pressure of the coolant to exclude coolant from the reactant flow passages and from the electrode support substrate.

FIG. 2 illustrates distribution of coolant water during normal operation of the fuel cell while it is supplying power to a load, as is described in the aforementioned U.S. Pat. No. 6,379,827.

During initial start-up of the power plant 10, the coolant water loop 64, 36 is filled with coolant water. The water pump 66 is actuated by the controller 54 to create a circulating flow of coolant water. Following start-up, the controller 54 then adjustably opens the valve 56 such that hydrogen reactant is admitted into the anode side of each of the cells in the power plant 10 at a predetermined pressure controlled by the controller 54 and/or the pressure regulator 58, and the controller actuates the blower or compressor 60 such that oxidant is admitted into the cathode side of each of the power plant cells. The controller 54 controllably actuates and adjusts the flow of the coolant and reactant in flow fields 36, 38, 48 in conjunction with the pressure transducer 77 in order to maintain the pressure within the coolant flow field 36 at a lower pressure than that of the anode and cathode flow fields 48, 38. The pressure differential is in the range of about 2 to 3 psi during normal on-load operation, and may be designated ΔP1.

During power plant operation, a limited portion of the circulating coolant water will migrate through the porous plates 14, into the projections 42 and against the anode side of the membrane 18. Any water which migrates through the membrane 18 from the anode side, as well as product water which is formed on the cathode side of the membrane 18 by the electrochemical reaction, is drawn by the pressure differential between the coolant flow field 36 and the oxidant flow field 38 into the cathode plate projections 30, and passes through the plate 12 into the water coolant flow field 36. This limited flow of the coolant water is depicted in FIG. 2 in which the arrows 90 are representative of the presence of water. Because of the greater pressure of the reactant gases, it is seen that the water is principally confined to the coolant water flow fields, with a limited amount passing through the projections 42 of the fine pore plates 12, 14, either to the anode side or from the cathode side of the MEA 16. Some water will also be evaporated into the oxidant stream and will vent from the system in the oxidant stream exhaust. The excess product water that is formed in the electrochemical reaction will be pumped into the line 64 along with the coolant water. All of the water in the coolant loop will be cooled in the heat exchanger 68, and excess product water in the loop will pass through a valve 74 and be drained from the accumulator 70.

During power plant shutdown, the controller 54 closes the supply valve 56 to stop the flow of fuel through the anode reactant flow fields 48, deactivates air blower or compressor 60 to stop the flow of air or oxygen through the cathode reactant flow fields 38, and slows the pump 66 and opens the valve 78 to raise the pressure of the coolant through the coolant flow fields 36. Before power plant shutdown, the coolant circulating through the coolant flow field 36 is prevented from entering the anode reactant flow field 48 and the cathode reactant flow field 38 by maintaining the respective reactant gases in these flow fields at a pressure which is 14 to 21 kPa (2 to 3 psi) greater than that of the coolant, resulting in pressure differential ΔP1, as described with respect to FIG. 2 in which the coolant, represented by arrows 90, is excluded from the reactant flow fields and is in limited availability to the support plates 21 and 25 and the MEA 16 through the projections 42 of the flow field plates 12, 14.

Figure 3:
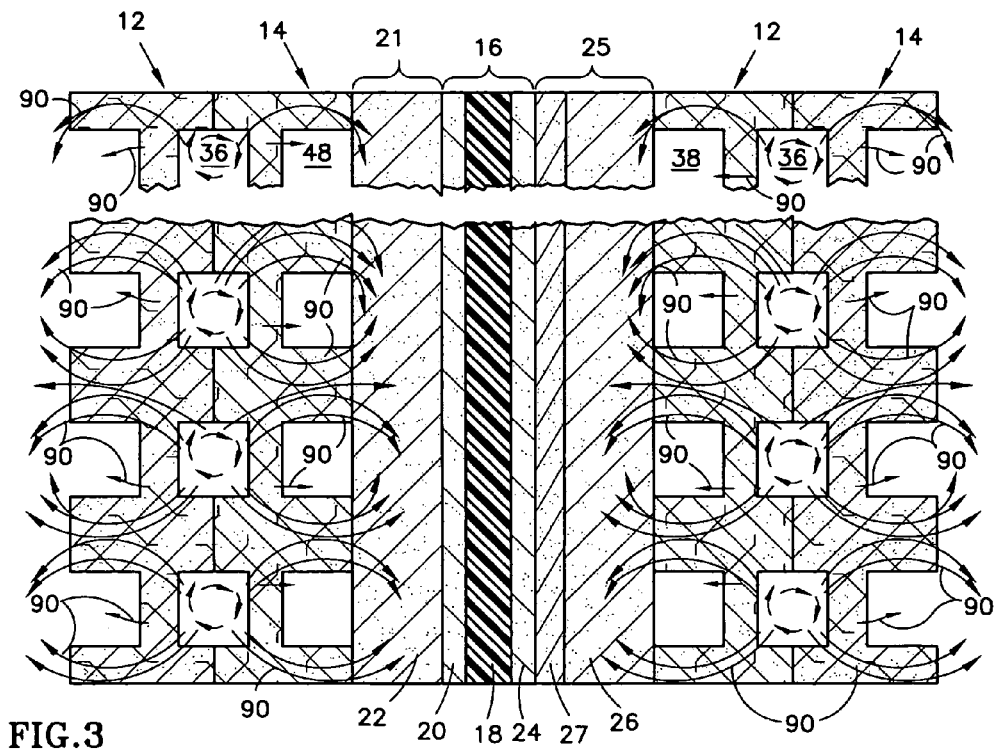
FIG. 3 is a stylized sectional view of the fuel cell illustrated in FIG. 1, illustrating the relative distribution of coolant during operation under load, when the pressure of the reactant gases are at a pressure slightly greater than the pressure of coolant, the pressure differential being sufficiently small to allow coolant to enter a substantial portion of the hydrophilic electrode support substrates.

Upon shutdown, however, the pressure levels in the reactant gas flow fields 38, 48 go substantially to ambient pressure, and the pressure of the coolant medium similarly moves to slightly below ambient pressure. The coolant flow field 36 may have been operating at a small suction less than ambient pressure, and that pressure is regulated during shutdown to achieve the desired rate of flooding, or saturation, of the substrates 22, 26. The new pressure differential, ΔP2 of the coolant flow field relative to the reactant flow fields is then such as will allow coolant to readily move into substrates 22, 26. This results in the condition depicted in FIG. 3, in which coolant, represented by arrows 90, rapidly migrates through the projections 42 of the flow field plates 12, 14 and floods both wettable substrates 22, 26. The pressure differential ΔP2 need only be a relatively small amount less than the 2 to 3 psi pressure differential ΔP1 in order for coolant to migrate into the wettable substrates 22, 26. For instance, if the pressure of the coolant is greater than, or substantially equal to, or even about 7 kPa (1 psi) less than the pressure of the reactant fields, the coolant will migrate into the wettable substrates 22, 26 and fill approximately 50% of the void volume of the substrates.

This migration of coolant from the flow field plates 12, 14 to the wettable substrates 22, 26 occurs at least in part as the result of capillary forces, or wicking, when the pressure of the coolant is 7 kPa (1 psi) less than the pressure in the reactant flow fields. The relatively small pore sizes and the wettable characteristic of the substrates 22, 26 facilitate the transfer of water coolant from the large coolant channels 36 through the fine pore plates 12, 14 and into the pores of those substrates, where it is retained. Assuming an average pore size of about 30 microns in the wettable substrates 22, 26, those substrates will remain filled with water so long as the pressure head acting against such retention is not greater than about 26–28 inches of water (7 kPa; 1 psi). Importantly, the height of the cell should be selected, and the average pore size in wettable substrates 22, 26 should be selected small enough, to retain the water coolant in the substrates without slumping. "Slumping" is the condition of being unable to retain a given quantity of the relevant liquid in all sections of its pores, with the result that parts of the structure are depleted of liquid. This condition is the result of several parameters associated with the structure and its environs, including pore size, wettability, liquid pressure head, etc. Thus, the pores in the wettable substrates 22, 26 should be small enough to prevent coolant slumping with the pressure head created by the height of the wettable substrates, which may typically be in the range of 6 to 15 inches resulting in maximum water pressures of 1.5–1.8 kPa (0.2–0.3 psi.

The wettable substrates 22, 26 immediately adjacent to the respective reactant flow field plates 14, 12 quickly flood because of the small pore sizes and the settable character of the substrates. This flooded region, if complete, creates a total barrier between the MEA 16 and any remaining reactant gases and/or heterogeneous gas atmosphere in the respective reactant flow fields 38, 48.

According to one embodiment of the invention, rather than allowing the pressure differential to become so low that the hydrophilic substrates will become totally filled with water, the pressure of the coolant is adjusted to be just under the normal range of 14 kPa–21 kPa (2 psi–3 psi) lower than the pressure of the reactant gases, so that the hydrophilic electrode support substrates do not totally fill with water, but become only partially filled with water. As described hereinbefore, a pressure differential of about 7 kPa (1 psi) will result in the electrode support substrates imbibing approximately 50% of the their water capacities. When pressure differential is reduced to 5–6 kPa (0.72–0.87 psi), the electrode support substrates will imbibe somewhere in the neighborhood of 60–80% of their water capacities. The pressure differential is controlled by adjusting the position of the valve 78. This supplies water for humidification of the membrane and for cooling, without blocking the reactant gases.

Figure 4:
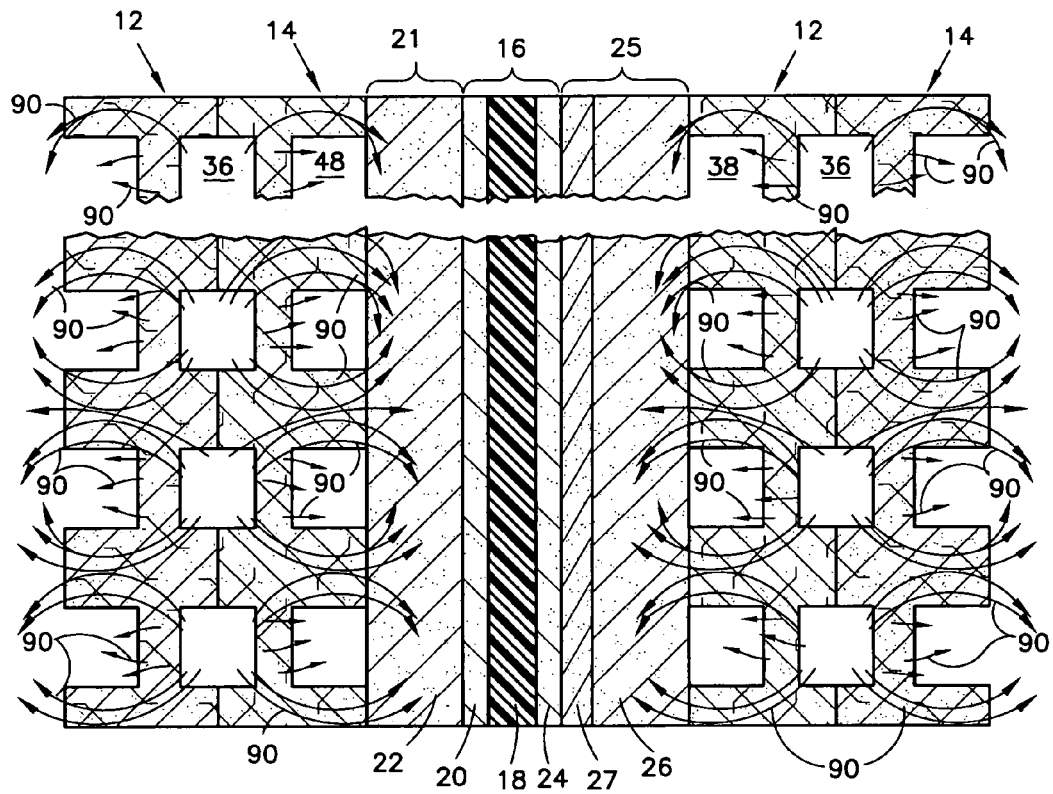
FIG. 4 is the same as FIG. 3, but after coolant is drained from the water passages.

The shutdown procedure is completed by stopping the coolant pump 66 and opening a vent high in the coolant system. This results in water from the coolant channels 36 and coolant manifolds (not shown) quickly draining into the water accumulator; the percent fill of the hydrophilic substrates with water is not substantially changed as a result of this drainage procedure. This is the condition shown in FIG. 4.

Figure 5:
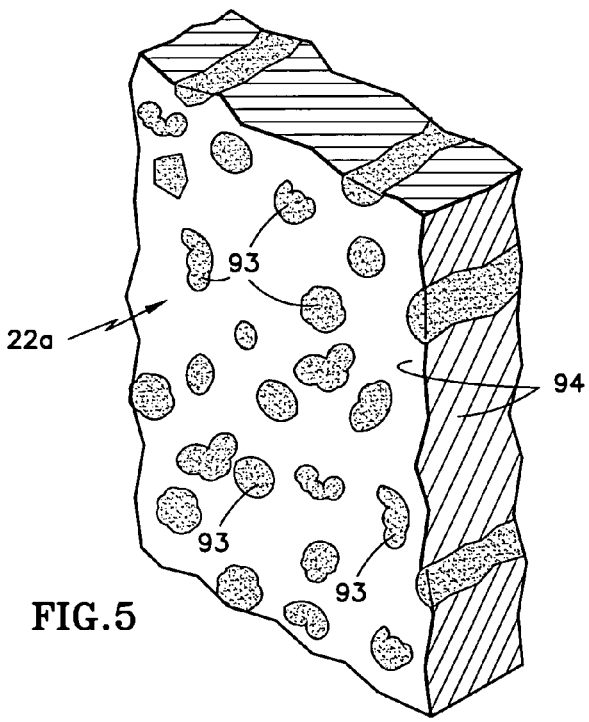
FIG. 5 is a fragmentary perspective view of a hydrophilic electrode support substrate having hydrophobic regions dispersed throughout.

Another embodiment of the invention, illustrated in FIG. 5, comprises an electrode support substrate 22a which has hydrophobic regions 93 in a hydrophilic substrate 94, the hydrophobic regions 93 comprising between 10% and 40%, and preferably about 30%, of the volume, and the hydrophilic regions 94 comprising between 60% and 90%, and preferably about 70%, of the volume of the electrode support substrate 22a. The hydrophilic and partially hydrophobic electrode support substrate 22a may be manufactured utilizing materials and processes set forth in the aforementioned U.S. Pat. No. 5,998,058.

Figure 1:
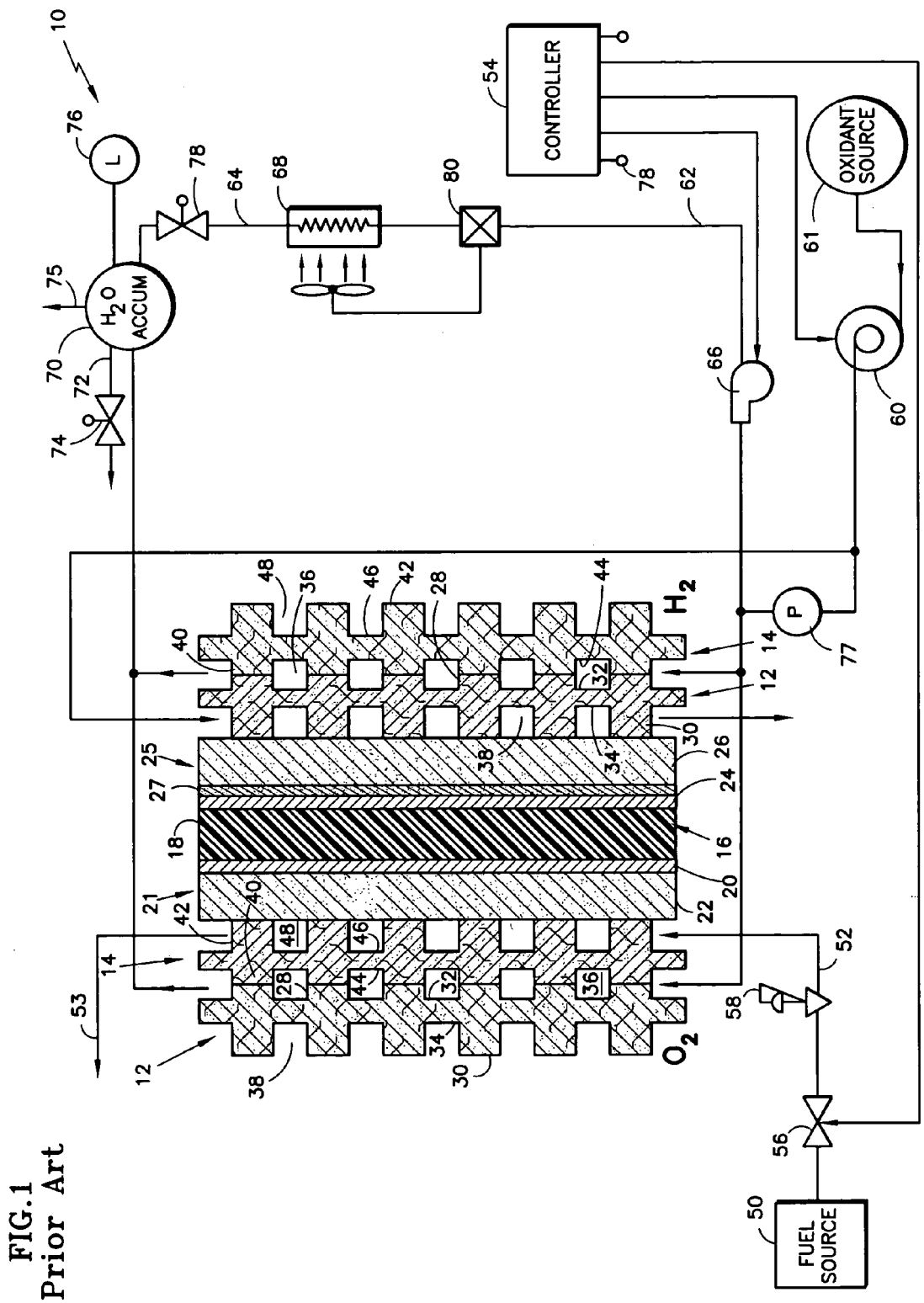
FIG. 1 is a schematic diagram of a fuel cell power plant, showing one and a fraction fuel cells as exemplary of a large number of such fuel cells utilized in a stack.

As described with respect to FIG. 1, one of the support plates 21, 25, and most commonly the cathode support plate 25, may have a contact bilayer 27 (a diffusion layer). In such a case, the support plate 25 may be made partially hydrophobic, and mostly hydrophilic, as described with respect to FIG. 5, by means of the contact bilayer 27 being partially hydrophobic and partially hydrophilic while the substrate 26 remains completely hydrophilic. This may be achieved in accordance with the process set forth in the aforementioned U.S. Pat. No. 6,024,848.

Thus, the support plate, such as the support plate 25, may have its partial hydrophilic, partial hydrophobic character in accordance with the invention either in a contact bilayer 27 or in the electrode support plate substrate 26. If desired, the support plate 21 for the anode may be provided partial hydrophilic and partial hydrophobic character, as described with respect to FIG. 5, while in the same fuel cell, the support plate 25 may derive its partial hydrophobic partial hydrophilic character by virtue of the contact bilayer 27.

When the support plate is partially hydrophilic and partially hydrophobic as described hereinbefore, a pressure differential between the coolant and the reactant gases can be reduced to substantially zero, simply by allowing the pressure of the coolant to rise (typically, by opening the throttling valve in the coolant line). In such a case, the partially hydrophilic, partially hydrophobic support plates will be filled with water except in the regions that are hydrophobic. These regions may comprise 10%–40% of the area of the support plate, and preferably, about 30% of the area of the support plate. The pressure differential is not critical when the support plates are partially hydrophilic and partially hydrophobic.

All of the aforementioned patents and patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

The invention claim is:

1. A method of operating a fuel cell power plant having fuel cells each comprising a membrane electrode assembly including a proton exchange membrane with cathode and anode electrode catalysts on opposed surfaces thereof, a support plate, at least a substantial portion of which is hydrophilic, adjacent to each catalyst, and hydrophilic porous water transport plate having passages for reactant gas and passages for coolant adjacent to each support plate, said method comprising:

during normal operation in which said fuel cell power plant supplies electric power to a load, maintaining a pressure of coolant in said coolant passages about 14 kPa–21 kPa (2 psi–3 psi) below the pressure of reactant gas in said reactant gas passages, thereby to allow only small volumes of water migrating between said reactant gas passages and said support plates;

during a shutdown procedure, reducing the pressure differential between the coolant and reactant gas so that said support plates are filled with coolant to about 50%–80% of their coolant capacity; and finally, draining water from the coolant passages.

2. A method according to claim 1 wherein:

said support plates are filled with coolant to about 70% of their coolant capacity.

3. A method according to claim 1 wherein:

said support plates are filled with coolant to about 50% of their coolant capacity.

4. A method according to claim 1 comprising:

during said shutdown procedure, adjusting the pressure of coolant in said water transport plates to between 3 kPa (0.44 psi) and 6.5 kPa (0.94 psi) below the pressure of reactant gases in said water transport plate.

5. A method according to claim 4 wherein said pressure differential is adjusted to between about 4 kPa (0.58 psi) and 5.2 kPa (0.75 psi).

6. A method according to claim 3 wherein said pressure differential is adjusted to about 4.8 kPa (0.7 psi).

7. A method according to claim 1, further comprising:

providing in said fuel cells, support plates which have substantially uniformly hydrophobic regions in a hydrophilic substrate to cause said substrate to be 10%–40% hydrophobic and 60%–90% hydrophilic.

8. A method according to claim 7 wherein:

said step of providing causes said substrate to be about 30% hydrophobic and about 70% hydrophilic.

* * * * *